No. 780,810. PATENTED JAN. 24, 1905.
C. P. PAYNE.
CONVEYER BOLT.
APPLICATION FILED AUG. 27, 1904.

WITNESSES:
INVENTOR
C. P. Payne.
BY
Victor J. Evans
Attorney

No. 780,810. Patented January 24, 1905.

UNITED STATES PATENT OFFICE.

CLAUDE P. PAYNE, OF HUNTSVILLE, ALABAMA.

CONVEYER-BOLT.

SPECIFICATION forming part of Letters Patent No. 780,810, dated January 24, 1905.

Application filed August 27, 1904. Serial No. 222,453.

*To all whom it may concern:*

Be it known that I, CLAUDE P. PAYNE, a citizen of the United States, residing at Huntsville, in the county of Madison and State of Alabama, have invented new and useful Improvements in Conveyer-Bolts, of which the following is a specification.

This invention relates to conveyer-couplings, such as are used in coupling together the tubular sections which make up a screw conveyer.

The objects of the invention are to improve, simplify, and strengthen the construction of such devices.

With the above and other minor objects in view, which will appear as the description proceeds, the invention resides in the particular combination and arrangement of parts and in the precise details of construction hereinafter described and claimed as a practical embodiment of the invention.

Figure 1:
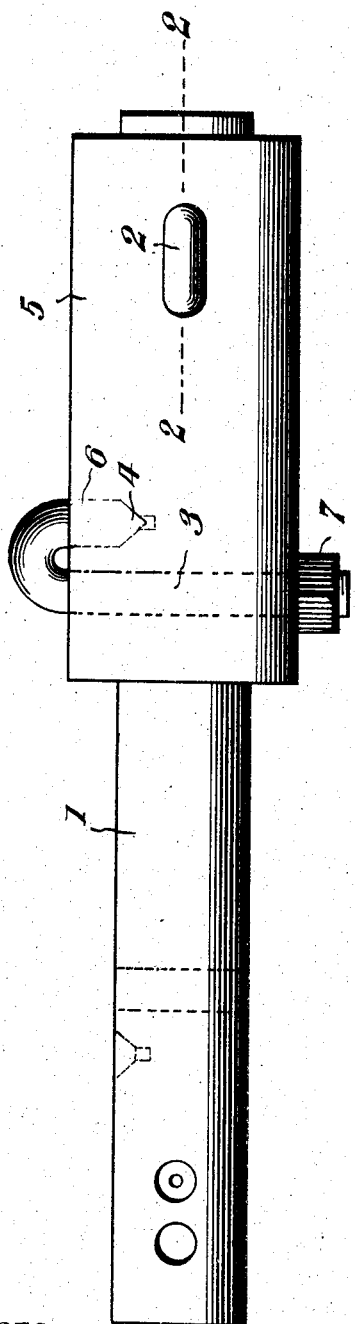
Figure 2:
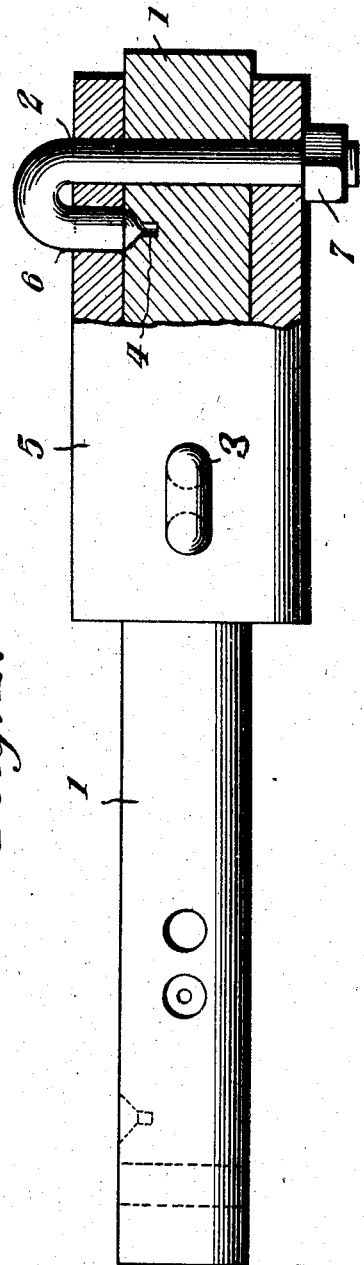

In the accompanying drawings, forming part of this specification, Figure 1 is a view in elevation of the coupling constructed in accordance with the invention. Fig. 2 is a similar view at right angles to Fig. 1, partly in section.

Like reference-numerals indicate corresponding parts in the two figures.

The reference-numeral 1 indicates a shaft such as is employed in coupling together the tubular sections of a screw conveyer. The shaft 1 is provided with a transverse bolt-hole, through which extends a bolt 2, and with a second transverse bolt-hole, through which extends a bolt 3, the bolts 2 and 3 being disposed at right angles to each other. Adjacent to each of the transverse bolt-holes the shaft 1 is formed with a socket 4, which is contracted or decreased in size at its lower end. The tubular conveyer-section 5 is formed with holes registering with the opposite ends of the bolt-holes in the shaft and also with holes registering with the contracted sockets. Each of the bolts 2 and 3 is formed with a pointed end 6, which is bent into parallel relation with the body portion of the bolt, as shown, and each bolt is also provided with a tightening-nut 7. It will be observed that each of the bolts 2 and 3 extends through the tubular section 5 and shaft 1 and that the pointed end of each bolt extends back through the tubular section and enters one of the contracted sockets in said shaft 1. By reason of this construction the tightening of the nut 7 of each bolt causes the pointed end of said bolt to be drawn tightly into the contracted socket of the shaft, thereby clamping the tubular section and the shaft tightly together by forcing the shaft toward the side of the tubular section opposite the pointed end of each bolt. Relative movement between the shaft and tubular section is thus effectually prevented.

It will be understood that a plurality of transverse bolt-holes arranged at right angles with respect to each other and each having a contracted socket adjacent thereto may be formed in the shaft 1 to receive the two tubular sections which are to be mounted thereupon.

By reason of the fact that the transverse bolt-holes and bolts in the shaft and tubular section are disposed at right angles with respect to each other the coupling is materially strengthened and braced and any tendency of the twisting pressure which is applied to the tubular sections of a screw conveyer to wear away the shaft is avoided by this expedient of extending the bolt at right angles with respect to each other.

In its particular combination and arrangement of parts and in its precise details of construction the coupling of this invention presents an improvement over prior couplings of a similar character.

Having thus described the invention, what is claimed as new is—

1. A conveyer-coupling comprising a shaft having a transverse bolt-hole therethrough, and a contracted socket adjacent to the hole, a tubular section upon the shaft having a hole in each side registering with the bolt-hole in the shaft, and a hole registering with the contracted socket, and a bolt extending through the shaft and tubular section and having a pointed end bent back into parallel relation with the body portion of the bolt and extending through the tubular section into the contracted socket.

2. A conveyer-coupling comprising a shaft having a plurality of transverse bolt-holes therethrough at right angles with respect to each other, and having a contracted socket adjacent to each hole, a tubular section on the shaft having holes registering with the bolt-holes in the shaft, and a hole registering with each of the contracted sockets, a bolt extending through each bolt-hole in the shaft and having a pointed end bent back into parallel relation with the body of the bolt and extending through the tubular section into the adjacent contracted socket, and a tightening-nut on each bolt.

3. A conveyer-coupling comprising a shaft, having a bolt-hole therethrough, and a socket adjacent to said bolt-hole, a tubular section upon the shaft, said section having a hole in each side registering with the bolt-hole, and a hole registering with the socket, and a bolt extending through the shaft and tubular section and having the end bent back into parallel relation with the body portion of the bolt and extending through the tubular section into said socket.

In testimony whereof I affix my signature in presence of two witnesses.

CLAUDE P. PAYNE.

Witnesses:
W. I. THOMPSON,
CHAS. T. GRIMMETT.